(12) United States Patent
Hazama

(10) Patent No.: US 6,339,600 B1
(45) Date of Patent: Jan. 15, 2002

(54) INFORMATION TRANSFER EQUIPMENT

(75) Inventor: Hisamichi Hazama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/182,038

(22) Filed: Oct. 29, 1998

(30) Foreign Application Priority Data

Jun. 1, 1998 (JP) .......................................... 10-151620

(51) Int. Cl.$^7$ ................................................ H04J 3/24
(52) U.S. Cl. .................................... 370/474; 370/458
(58) Field of Search ................................ 370/442, 321, 370/337, 347, 458, 498

(56) References Cited

U.S. PATENT DOCUMENTS

| | | | | |
|---|---|---|---|---|
| 4,792,948 A | * | 12/1988 | Hangen et al. | 370/376 |
| 5,638,371 A | * | 6/1997 | Raychaudhuri et al. | 370/347 |
| 5,883,884 A | * | 3/1999 | Atkinson | 370/279 |
| 6,084,863 A | * | 7/2000 | Hori | 370/315 |
| 6,216,107 B1 | * | 4/2001 | Rydbeck et al. | 704/500 |
| 6,219,562 B1 | * | 4/2001 | Williams | 455/561 |

* cited by examiner

Primary Examiner—David R. Vincent
(74) Attorney, Agent, or Firm—Rosenman & Colin LLP (57) ABSTRACT

An information transfer equipment executes a monitoring control of channel portions by transmitting/receiving plural kinds of monitoring control information between the channel portions and a common portion. A multiplexer of the common portion multiplexes the monitoring control information into a TDM frame to be transmitted to the channel portions. A demultiplexer of each of the channel portions receives the monitoring control information from the common portion based on a channel number preset to its own to be demultiplexed. A multiplexer of each channel portion multiplexes the monitoring control information into the TDMA frame based on the number. A demultiplexer of the common portion receives the monitoring control information from each channel portion to be demultiplexed from the TDMA frame according to kinds of the monitoring control information.

13 Claims, 7 Drawing Sheets

FIG. 2A  CPU WRITE ACCESS (EXTRACTION ONLY TOWARD CH PORTION)

FIG. 2B  FRAME PULSE 120 (COMMON PORTION ⇔ CH PORTION)

FIG. 2C  TDM FRAME 112

FIG. 2D  PACKET DATA 105

FIG. 5

FIG.6A FRAME PULSE 120

FIG.6B TDMA MULTI-FRAME 114 FROM CHANNEL PORTION TO COMMON PORTION (320 TDMA FRAMES 114 = 1 TDMA MULTI-FRAME 115)

FIG.6C STATUS SIGNAL/RPS COMMAND SIGNAL (STP-ST7)

STATUS SIGNAL=TRANSMISSION STATUS SIGNAL 98+CHANNEL NUMBER+RESEND DEMAND SIGNAL 99
RPS NOTIFICATION = SW OPERATION STATUS SIGNAL 107+RPS INITIATOR SIGNAL 108

FIG. 7
PRIOR ART

INFORMATION TRANSFER EQUIPMENT

BACKGROUND OF THE INVENTION

1. Field of the Invention

The present invention relates to an information transfer equipment, and in particular to an information transfer equipment which executes a monitoring control of each of channel portions by transmitting/receiving plural kinds of monitoring control information between the channel portions and a common portion.

In recent years, a communication system has aimed at a high transmission capacity and an enhanced monitoring control function regardless of its kind, resulting in an enlarged hardware scale. In a system accomplishing the monitoring control function, it is important that an information transfer equipment works efficiently on the aspects of function and cost.

2. Description of the Related Art

Generally, an information transfer equipment mounts thereon a microprocessor (CPU) and performs its main function with firmware/software. In particular, a function block which manages a monitoring control has achieved a speedup and a high-performance in the form of multi-CPU.

Also, such an information transfer equipment enlarged in its hardware scale as mentioned above is generally composed of a plurality of racks. Accordingly, the monitoring control apparatus must execute the monitoring control to all of the racks.

Figure 7:
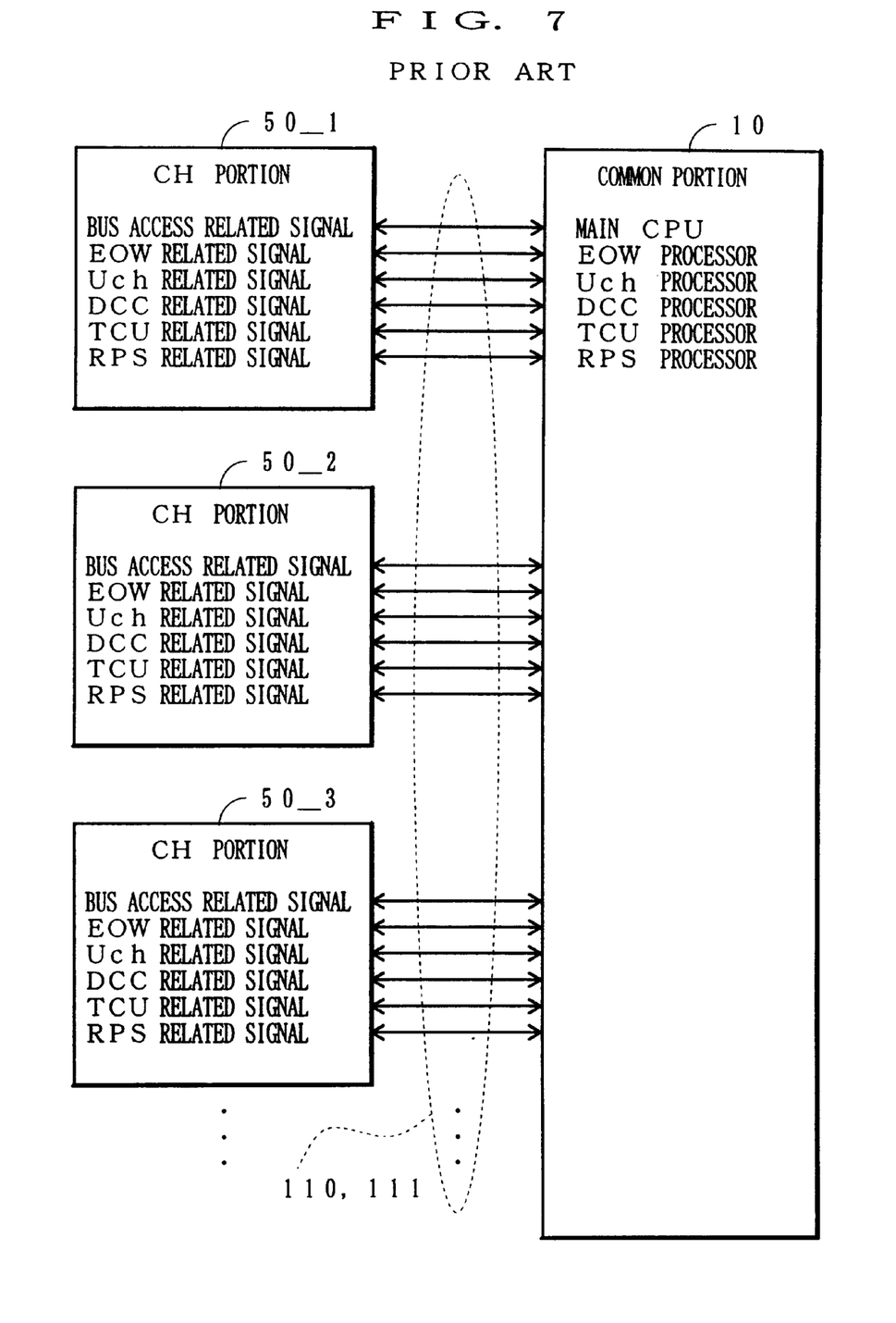
FIG. 7 is a block diagram showing an arrangement of a conventional information transfer equipment.

FIG. 7 shows an arrangement of a conventional information transfer equipment in the monitoring control apparatus of a communication system adapted to SDH (Synchronous Digital Hierarchy). The conventional information transfer equipment comprises channel portions (=CH portions) 50_1, 50_2, 50_3, . . . (hereinafter sometimes generally referred to as "50") which are transmission system processors and a common portion 10 which is connected to each of the channel portions 50_1, 50_2, 50_3, . . . . The common portion 10 comprises a main CPU, an Engineering order wire (hereafter abbreviated as EOW) processor (processing unit), a user channel (hereinafter abbreviated as Uch) processor, a DCC (Data Communication Channel: hereinafter abbreviated as DCC) processor, a system clock source (hereinafter abbreviated as TCU) processor, and a Radio Protection switchover (hereinafter abbreviated as RPS) processor.

Between each of the channel portions 50 and the main CPU, the EOW processor, the Uch processor, the DCC processor, the TCU processor, and the RPS processor, a bus access related signal, an EOW related signal, a Uch related signal, a DCC related signal, a TCU related signal, and an RPS related signal which all form monitoring control information are transferred.

Namely, the common portion 10 and each of the channel portions 50 have processors which execute processes corresponding to the types of the above-mentioned signals. The processors transmit and receive those signals through physically different transmission/reception lines 110, 111 prepared for each signal type.

In operation, each of the channel portions 50 executes a terminal process of a main signal transmission line per channel, and transmits the monitoring control information to the common portion 10 through the reception line 111. The common portion 10 sends the monitoring control information and a control signal to the channel portions 50 through the transmission line 110.

In the common portion 10, the main CPU executes a write and a read access to each of the channel portions 50 with an address signal, a data signal, a memory read signal, a memory write signal and the like which are bus access related signals for the monitoring control to the channel portions 50.

The EOW processor, the Uch processor, and the DCC processor transmit/receive E1 and E2 byte signals for voice consultation or F1 byte signal an operator of the network uses, and D1–D12 byte signals by which the monitoring control information is transferred, respectively defined by an overhead of STM (Synchronous Transport Module) signal of the SDH, to/from each of the channel portions 50, and process them. The TCU processor transmits/receives clock quality information of the common portion 10 and the channel portion 50 to/from each of the channel portions 50. The RPS processor transmits/receives a switchover signal, an RPS initiator notification and the like which are wireless related control information peculiar to a multiplex wireless apparatus to/from each of the channel portions 50.

In such a conventional information transfer equipment, the number of an interface cable which connects the common portion to each of the channel portions increases in proportion to the number of the channel portions and the signal type. Also, in the common portion, it has been necessary to normally prepare interface access points corresponding to the largest number of the channel portion which can be connected, so that the following points have been main causes of increased cost of the equipment:

①  The cable cost is high;
②  The connector cost is high;
③  It is necessary to detect each cable disconnection or to generate an equivalent alarm, so that alarm items of a circuit fault increase and press the monitoring control process;
④  A burden of an installation and a local adjustment of the equipment increases;
⑤  Since a transmission between racks is required and it is inevitable to use an input/output device for an interface signal, the number of the devices and electric power consumption increase, leading to an increase in cost.

SUMMARY OF THE INVENTION

It is accordingly an object of the present invention to provide an information transfer equipment which executes a monitoring control of each of channel portions by transmitting/receiving plural kinds of monitoring control information between the channel portions and a common portion in which the monitoring control information is transferred without any increase in cost and burden of a monitoring control process of the equipment.

[1] To achieve the above-mentioned object, in the information transfer equipment according to the present invention, as shown by a schematic arrangement in FIG. 1, a multiplexer of a common portion 10 multiplexes and transmits, by broadcasting, monitoring control information 90 into a predetermined position of a Time Division Multiplexing (hereinafter abbreviated as TDM) frame. A demultiplexer of each of channel portions 50_1–50_8 receives the TDM frame and demultiplexes therefrom the monitoring control information 90.

Also, the multiplexer of the channel portions 50 multiplexes and transmits each of the monitoring control information 90_1–90_8 (hereinafter generally referred to as "90") into a Time Division Multiple Access (hereinafter abbreviated as TDMA) frame based on a channel number preset for its own. A demultiplexer of the common portion 10 receives the TDMA frame and demultiplexes therefrom the monitoring control information 90.

Namely, the common portion 10 executes the TDM-multiplexing of plural kinds of the monitoring control information 90 on a transmission line 110 of one system and broadcasts it to the channel portions 50. Each of the channel portions 50 executes the TDMA-multiplexing of the monitoring control information 90 of its own on the reception line 111 of one system and transmits it to the common portion 10.

As a result, it becomes possible to connect the common portion 10 to the channel portions 50 with the information transfer equipment in which an interface is integrated to one system.

[2] In the above-mentioned invention [1], the multiplexer of each of the channel portions 50 may transmit a transmission timing of the TDMA frame 114 in synchronization with a timing of the TDM frame 112.

As a result, it becomes possible to easily synchronize transmission/reception timings of the multiplexers and the demultiplexers in the common portion 10 and each of the channel portions 50.

[3] In the above-mentioned invention [1], processors of the common portion 10 and each of the channel portions 50 may process the monitoring control information 90 including overhead information of an STM signal of SDH. The multiplexer of the common portion 10 may multiplex the monitoring control information 90 including the overhead information into the TDM frame synchronized with a synchronous clock of the SDH for broadcasting.

The multiplexer of each of the channel portions 50_1–50_8 multiplexes the monitoring control information 90 including the overhead information into the TDMA frame synchronized with the synchronous clock for transmission. As a result, it becomes possible to easily adapt the information transfer equipment to an SDH communication system.

[4] In the above-mentioned invention [3], a buffer of each of the channel portions 50_1–50_8 may temporarily store the overhead information in the TDM frame. The overhead information stored in the buffer is written in a predetermined position of the overhead of the STM signal at a predetermined timing.

Also, a second buffer reads out the information in the overhead of the STM signal at a predetermined timing and temporarily stores it. The overhead information stored in the second buffer is written in a predetermined position of the TDMA frame at a predetermined timing.

As a result, it becomes possible for each of the channel portions 50 to equivalently execute a speed conversion of the overhead information in the TDM frame through the buffer, which is multiplexed into the overhead of the STM signal, and to equivalently execute a speed conversion of the overhead information in the STM signal through the other buffer, which is multiplexed into the predetermined position of the TDMA frame.

[5] In the above-mentioned invention [1], a setting portion of each of the channel portions 50 sets time slots of the TDM frame and the TDMA frame corresponding to the channel number from the outside. Each of the channel portions 50 accesses the designated time slots of the TDM frame to receive the monitoring control information 90, and the designated time slots of the TDMA frame to transmit the monitoring control information 90.

As a result, it becomes possible for each of the channel portions 50 to designate and change a communication circuit channel (the time slots of the TDM and TDMA frames) which is accessed to transmit the monitoring control information 90.

Figure 2A:
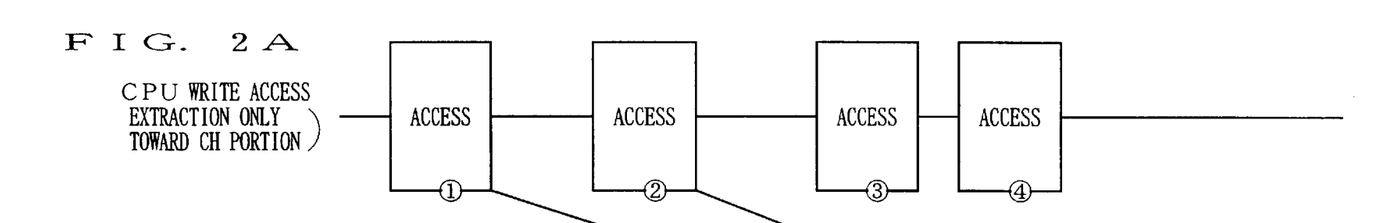
FIGS. 2A–2D are time charts illustrating operation examples of a CPU write access used in an information transfer equipment according to the present invention.
Figure 2B:
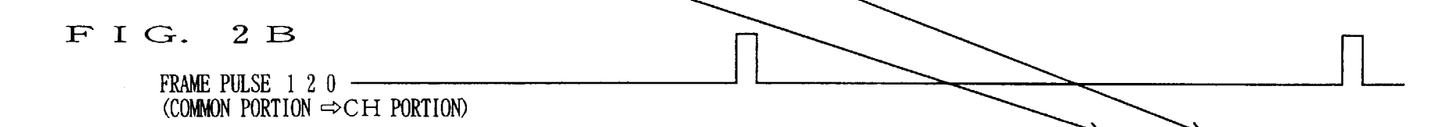

[6] In the above-mentioned invention [1], a CPU of the common portion 10 processes the monitoring control information 90. The operation of the CPU upon a write access to each of the channel portions 50 will now be described referring to FIG. 2 as follows:

A packet generator in the common portion 10 extracts an address or data on the system bus of the CPU at every timing when the CPU makes the write access to each of the channel portions 50 to generate packet data (see FIG. 2A ①, ②).

A packet buffer divides the packet data into an amount which can be transmitted within one period of the TDM frame (see FIG. 2B) for the accumulation. A write data read controller reads out the packet data by a single TDM frame from the packet buffer and multiplex the same into predetermined prescribed slots of the TDM frame (see FIG. 2C ①, ②).

Figure 2C:
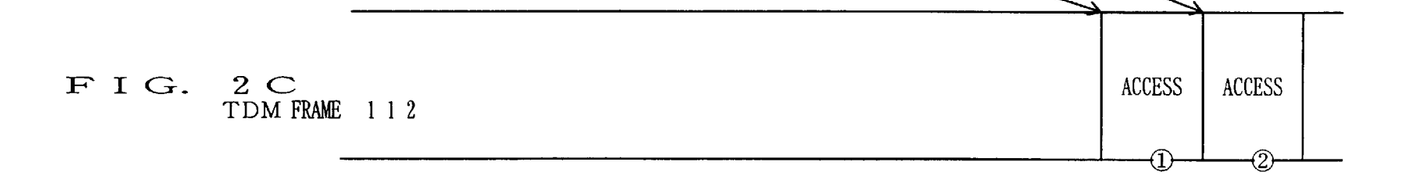
Figure 2D:
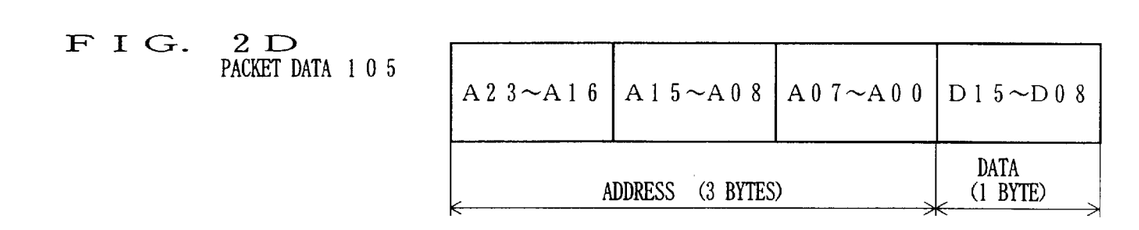

A CPU bus generator of each of the channel portions 50 generates a pseudo CPU bus of the CPU from the address and the data of the packet data received from the TDM frame.

As a result, it becomes possible for the common portion 10 to transmit a CPU write signal which is the monitoring control information 90 the CPU outputs on the system bus addressed to the channel portions 50 to the TDM frame, and for each of the channel portions 50 to output the CPU write signal to the pseudo CPU system bus of its own.

[7] In the above-mentioned invention [6], at least one packet write threshold may be preset. The packet generator monitors the packet data amount accumulated in the packet buffer. When the packet data amount has exceeded the threshold, the return of an acknowledge signal transmitted to the CPU is delayed.

As a result, a cycle in which the CPU makes the write access to each of the channel portions 50 is delayed, and it becomes possible to prevent the packet buffer from overflowing.

It is also possible to suppress the packet data from the CPU by setting a plurality of thresholds and delaying the return of the acknowledge signal as the remaining memory capacity of the packet buffer becomes less.

[8] In the above-mentioned invention [6], a packet read controller of the common portion 10 adds error detection data to the packet data accumulated in the packet buffer and transmit the same to the TDM frame. When an error is detected in the received packet data based on the error detection data in each of the channel portions 50, a resend demand signal of the packet data is transmitted to predetermined time slots of the TDMA frame regardless of the packet data being addressed to its own or not.

When a write data read portion receives the resend demand signal in the common portion 10, the packet data in the last frame is resent. Also, when the resend demand signal of the same packet data has reached a predetermined largest number of resend times, the resending operation is stopped.

As a result, it becomes possible for the CPU to transfer write data as the monitoring control information 90 transmitted to the channel portions 50 at a small error rate and to avoid a useless resending operation due to the fault of the equipment or the like.

[9] In the above-mentioned invention [1], an address generator in each of the channel portions 50 generates a read address for the pseudo CPU, and a CPU bus generator generates a data read signal in the pseudo CPU bus of the CPU based on the read address. The data buffer stores the data and the read address accessed by the data read signal, and the multiplexer transmits the stored data and the read address to predetermined time slots of the TDMA frame.

The demultiplexer in the common portion 10 demultiplexes the read address and the data from the predetermined time slots of the TDMA frame and stores the data at the read address in a CPU read interface memory. The CPU reads in the data from the CPU read interface memory through the system bus.

As a result, it becomes possible for the CPU of the common portion 10 to read in the data as the monitoring control information 90 read out on the pseudo CPU bus of each of the channel portions 50 through the transmission line 111 of the TDMA frame.

[10] In the above-mentioned invention [9], the multiplexer in the common portion 10 transmits a TDM multi-frame composed of a plurality of TDM frames including a TDM frame number. The demultiplexer in each of the channel portions 50 establishes a synchronization for the TDM multi-frame to demultiplex the TDM frame number.

The multiplexer in each of the channel portions 50 synchronizes the TDMA frame composed of a plurality of the TDMA frame with the TDM multi-frame and multiplexes the read data stored in the data buffer with the TDM frame number and the time slot position corresponding to the TDMA frame as address information into the TDMA frame and transmit the same.

The demultiplexer in the common portion 10 demultiplexes the read data, and the CPU interface memory stores the read data at the address corresponding to the TDM frame number and the slot position corresponding to the TDMA frame into which the read data is multiplexed. The CPU reads in the data from the CPU read interface memory through the system bus.

As a result, it becomes possible to transfer the read data as the monitoring control information 90 read out on the pseudo CPU bus in each of the channel portions 50 to the CPU in the common portion 10 through the transmission line 111 without inserting the read address into the TDMA frame 114.

[11] In the above-mentioned invention [10], an arithmetic unit in each of the channel portions 50 adds error detection data to the read data. A data error detector in the common portion 10 carries out the error detection based on the error detection data. When the error is detected, the CPU read interface memory abandons the read data and holds the read data in the previous state.

It means that error read data are not read in the CPU read interface memory and the error read data are not transferred to the CPU.

[12] In the above-mentioned invention [11], when the read data with an error detected is information indicating a mounting status of each of the channel portions 50, a fixed value indicating that an error has been detected is compulsorily written in the interface memory. When the read data is other information, the received data is abandoned and held in the previous state.

Namely, it becomes possible for the CPU of the common portion 10 to recognize that the mounting status of each of the channel portions 50 is abnormal from the fact that the fixed value is written in the address corresponding to the mounting status of the interface memory.

[13] In the above-mentioned invention [11], the monitoring control information may include transmission status information to the TDMA frame of the channel portion 50, control status information for the channel portions in the common portion 10, circuit switchover control information of the channel portions, and system clock control related information.

BRIEF DESCRIPTION OF THE DRAWINGS

Throughout the figures, like reference numerals indicate like or corresponding components.

Description of the Embodiments
Embodiments of Common Portion 10

Figure 3:
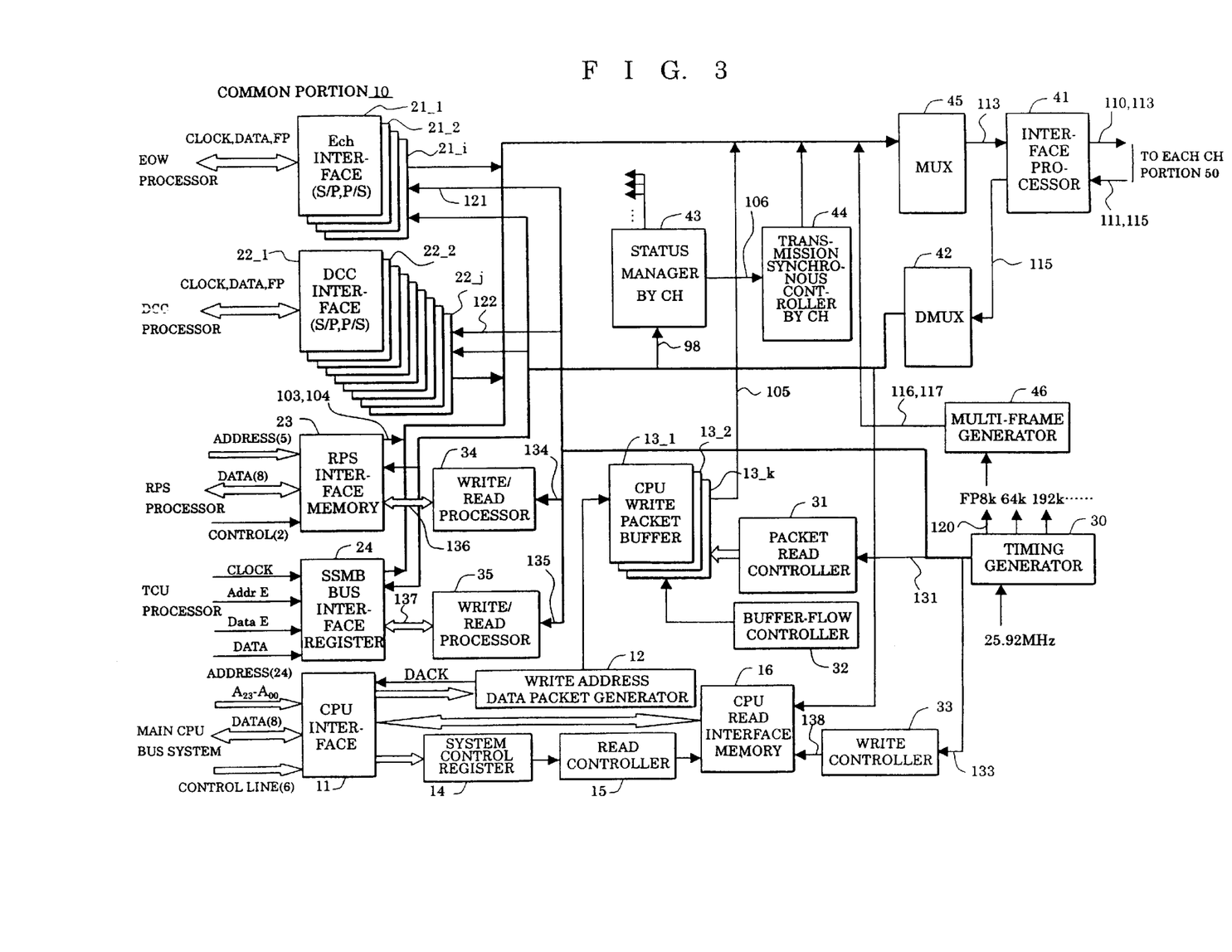
FIG. 3 is a block diagram showing an embodiment of a common portion used in an information transfer equipment according to the present invention.

FIG. 3 shows an embodiment of a common portion 10 in an information transfer equipment according to the present invention. In this embodiment the information transfer equipment is shown as adapted to an SDH multiplexing wireless communication system.

The common portion 10 is provided with Ech interfaces 21-1–21-$i$ (hereinafter generally referred to as "21"), DCC interfaces 22-1–22-$j$ (hereinafter generally referred to as "22"), an RPS interface memory 23, a register 24, and a CPU interface 11 respectively connected to the EOW processor, the DCC processor, the RPS processor, the TCU processor, and the main CPU bus system shown in FIG. 10.

A write address data packet generator 12, a system control register 14, and a CPU read interface memory 16 are connected to the interface 11, and a read controller 15 is connected between the register 14 and the memory 16.

Also, CPU write packet buffers 13-1–13-$k$ (hereinafter generally referred to as "13") are commonly connected to the packet generator 12. The packet buffer 13, the interfaces 21, 22, the memory 23 and the register 24 are commonly connected to an input terminal of a multiplexer 45 along with a transmission synchronous controller (by channels) 44 and a multi-frame generator 46. An output terminal of the multiplexer 45 is connected to an interface processor 41, which is connected to transmission lines 110, 111 on the output and the input side. The processor 41 is also connected to a demultiplexer 42, which is commonly connected to the interfaces 21, 22, the memory 23, the register 24, the memory 16 and a status manager (by channels) 43. The status manager 43 is connected to the synchronous controller 44.

In addition, a timing generator 30 is commonly connected to the interfaces 21, 22, write/read processors 34, 35, a packet read controller 31 and a write controller 33. The write controller 33 is connected to the memory 16, and the write/read processors 34, 35 are mutually connected to the memory 23 and the register 24, respectively. The packet read controller 31 and a buffer flow controller 32 are connected to the packet buffers 13.

Operation (1) of Common Portion 10

The operation of the common portion 10 when monitoring control information is transmitted from the EOW processor, the DCC processor, the RPS processor, the TCU processor, and the main CPU to each of channel portions 50 through the transmission line 110 will now be described referring to FIG. 3 as follows:

First of all, the timing generator 30 inputs a signal of basic frequency 25.92 MHz to generate signals whose frequencies are 8 kHz (frame pulse 120), 64 kHz and 192 kHz which are required for the equipment. Then, the length of a TDM frame is counted at every signal with the frequency of 8 Hz. By the counted value from the frame head a time slot position of the present frame is acknowledged to generate timing signals 121, 122, 131, 133, 134 and 135 and to execute a synchronization process of an internal process logic.

It is to be noted that this synchronization process is executed in synchronization with a synchronous clock of an STM1 signal of the SDH connected to the channel portion 50.

The timing generator 30 provides the above-mentioned timing signals 121, 122, 131, 133, 134, 135 for the interfaces 21, 22, the packet read controller 31, the write controller 33, and the write/read processors 34, 35 respectively, and provides the frame pulse 120 or the like for the multi-frame generator 46.

The multi-frame generator 46 generates, based on the frame pulse 120, a multi-frame marker (sometimes referred to as a multi-frame pulse) 116="1111" and a frame number 117 to generate a TDM multi-frame 113 into which the marker and the frame number are inserted, which is transmitted to the multiplexer 45.

The interfaces 21, 22 each have a built-in speed conversion buffer, which performs a serial conversion of E1, E2 byte data (EOW) respectively on a wireless and a wire circuit side of a parallel signal which is the monitoring control information sent from the EOW processor and the DCC processor, and M1-RSDCC, M1-MSDCC byte data respectively on the wireless and the wire circuit side, Mn-RSDCC byte data on the wireless circuit side, and M2-RSDCC–M7-RSDCC byte data on the wire circuit side, which are temporarily stored in the built-in buffer. The byte data are multiplexed into a predetermined position of the TDM multi-frame 113 in the multiplexer 45 at the timing of the timing signals 121, 122.

The memory 23 temporarily stores wireless related control information (an RPS_SW drive signal 103 and a BSW number signal 104) which is the monitoring control information sent from the RPS processor. These signals are sent to the multiplexer 45 at the timing of the timing signal 134 from the write/read processor 34 and multiplexed into the predetermined position of the TDM multi-frame 113.

The register 24 temporarily stores clock quality information (an SSMB signal SSMB ④) which is also the monitoring control information sent from the TCU processor. This signal is sent to the multiplexer 45 at the timing of the timing signal 135 from the write/read processor 35 and multiplexed into the predetermined position of the TDM multi-frame 113 in the multiplexer 45.

The packet generator 12 extracts, through the interface 11, only a CPU write signal which is outputted onto the main CPU bus system at random and accesses each of the channel portions 50. Then, the conversion of 3 byte write address and 1 byte data into 1 packet data 105 is performed (see FIG. 2D), and 1 byte parity check data are added to 15 packets of data, which are sequentially outputted to the packet buffers 13_1–13_k to form 1 block data.

Moreover, monitoring the remaining memory capacity of the packet buffer 13 and having found that it has reached a preset threshold value, the packet generator 12 sends an acknowledge signal DACK to the main CPU through the interface 11. While receiving the signal DACK, the main CPU does not access the channel portions 50. As a result, it becomes possible to prevent the packet buffer 13 from overflowing.

The packet read controller 31 and the buffer flow controller 32 carries out a read control to the 15 packet data (105) CPU_WR1–15 and 1 byte parity data CPU_WR_PRT stored in the packet buffer 13 as 1 block data at the timing of the timing signal 131 and send the same to the multiplexer 45, where the packet data 105 is multiplexed into the predetermined position of a TDM frame 112.

The status manager 43 manages a transmission control status of its own based on a received transmission status signal 98, which will be described later, of each of the channel portions 50, and sends a transmission control signal 106 and a channel number to the synchronous controller 44. The transmission control signal 106 and the channel number are transferred to the multiplexer 45 at the predetermined timing by the synchronous controller 44 and multiplexed into the predetermined position of the TDM multi-frame 113.

The multiplexer 45 transmits the TDM multi-frame 113, into which the above-mentioned signals sent from the interfaces 21, 22, the memory 23, the register 24, the packet buffer 13 and the synchronous controller 44 are multiplexed, to the transmission line 110 through the processor 41.

Moreover, the signals transmitted from the common portion 10 to each of the channel portions 50 comprise a frame pulse signal 120 and a clock signal besides the above-mentioned TDM multi-frame 113 transmitted to the transmission line 110.

Figures 4A, 4B:
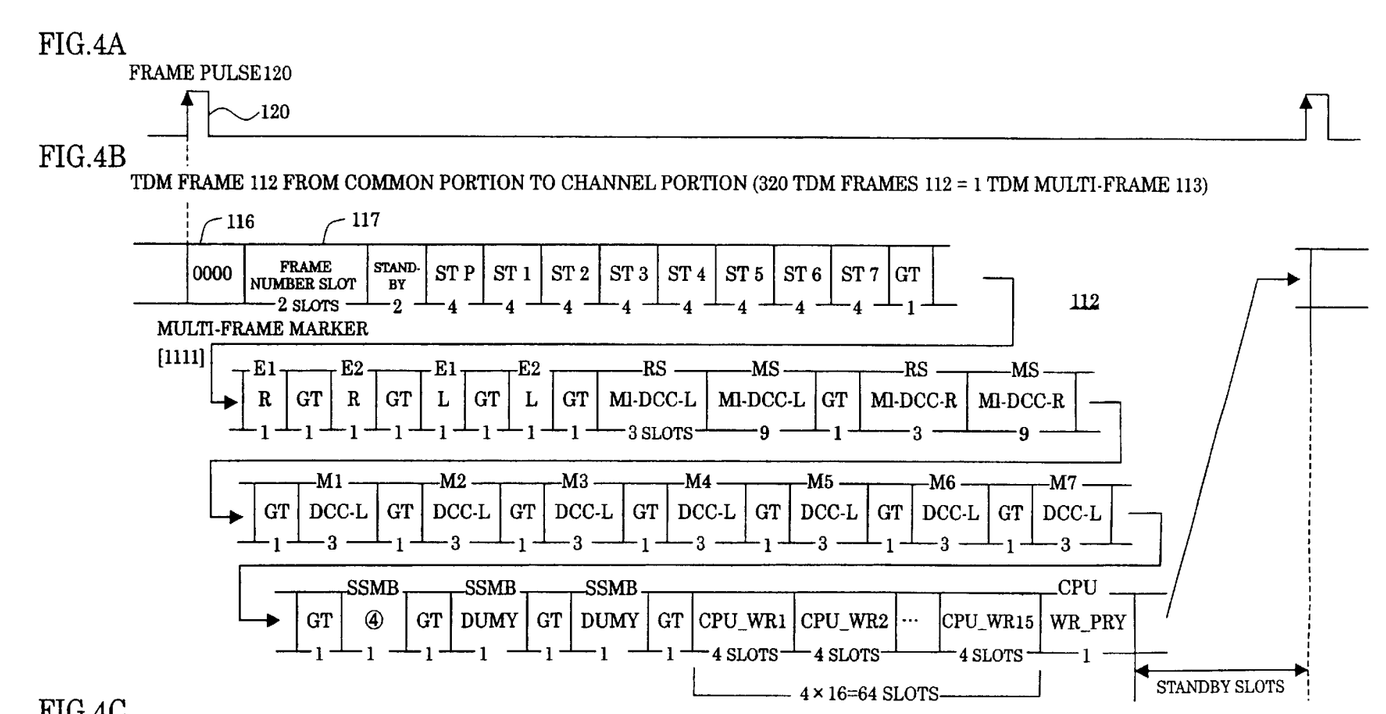
FIGS. 4A–4C are time charts illustrating arrangements of a TDM frame used in an information transfer equipment according to the present invention.

FIG. 4B shows an arrangement of the TDM frame 112 of the signal multiplexed by the multiplexer 45 and outputted therefrom, and FIG. 4A shows the frame pulse 120, which is a frame synchronizing pulse of 8 kHz.

The TDM frame 112 comprises a multi-frame marker 116, a frame number 117, status/RPS command signals STP, ST1–ST7, E1chs, E2chs which are EOW signals on the wireless and the wire circuit side, M1-RSDCC's and M1-MSDCC's which are DCC signals on the wireless and the wire circuit side, an Mn-RSDCC signal on the wireless circuit side, M2-RSDCC–M7-RSDCC signals on the wire circuit side, one SSMB signal SSMB ④, two SSMB signals DUMY, fifteen CPU write signals CPU_WR1-15 which compose the packet data 105, and data WR-PRY which are parity check data of the packet data 105. Each of them has slots whose number is shown in FIG. 4B with a unit slot being composed of 8 bits.

In addition, one TDM multi-frame 113 is composed of the TDM frame 112 aggregated by 320 frames. When the multi-frame marker 116 is "1111", indicating the first frame of the multi-frame, "0"–"319" frames are inserted into the slot of the frame number 117 in synchronization with this multi-frame marker 116.

It is to be noted that a guard time slot GT is inserted into a suitable position of the TDM frame 112 in consideration of a wireless data transfer.

Figure 4C:
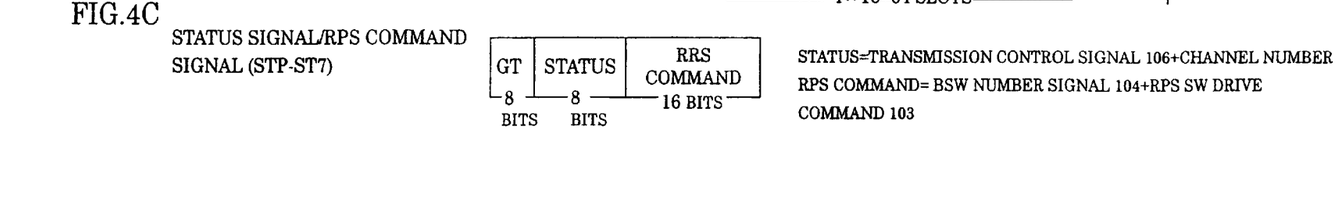

FIG. 4C shows an arrangement of the status/RPS command signals STP, ST1–ST7, which comprise the guard time GT of 8 bits and the status of 8 bits and the RPS command of 16 bits. The status signal comprises the transmission control signal 106 and the channel number, and the RPS command signal comprises the number signal 104 and a drive command 103.

Embodiment of Channel Portions 50

Figure 1:
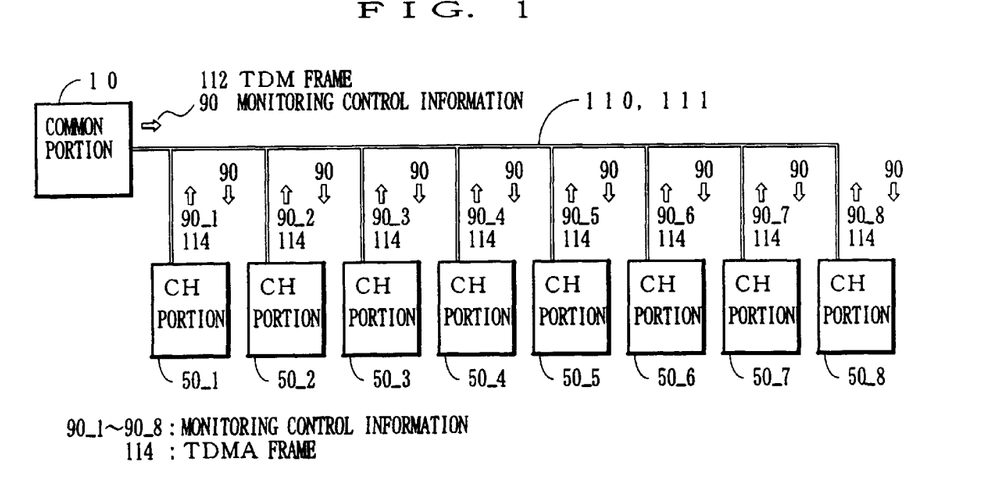
FIG. 1 is a block diagram showing a schematic arrangement of an information transfer equipment according to the present invention.
Figure 5:
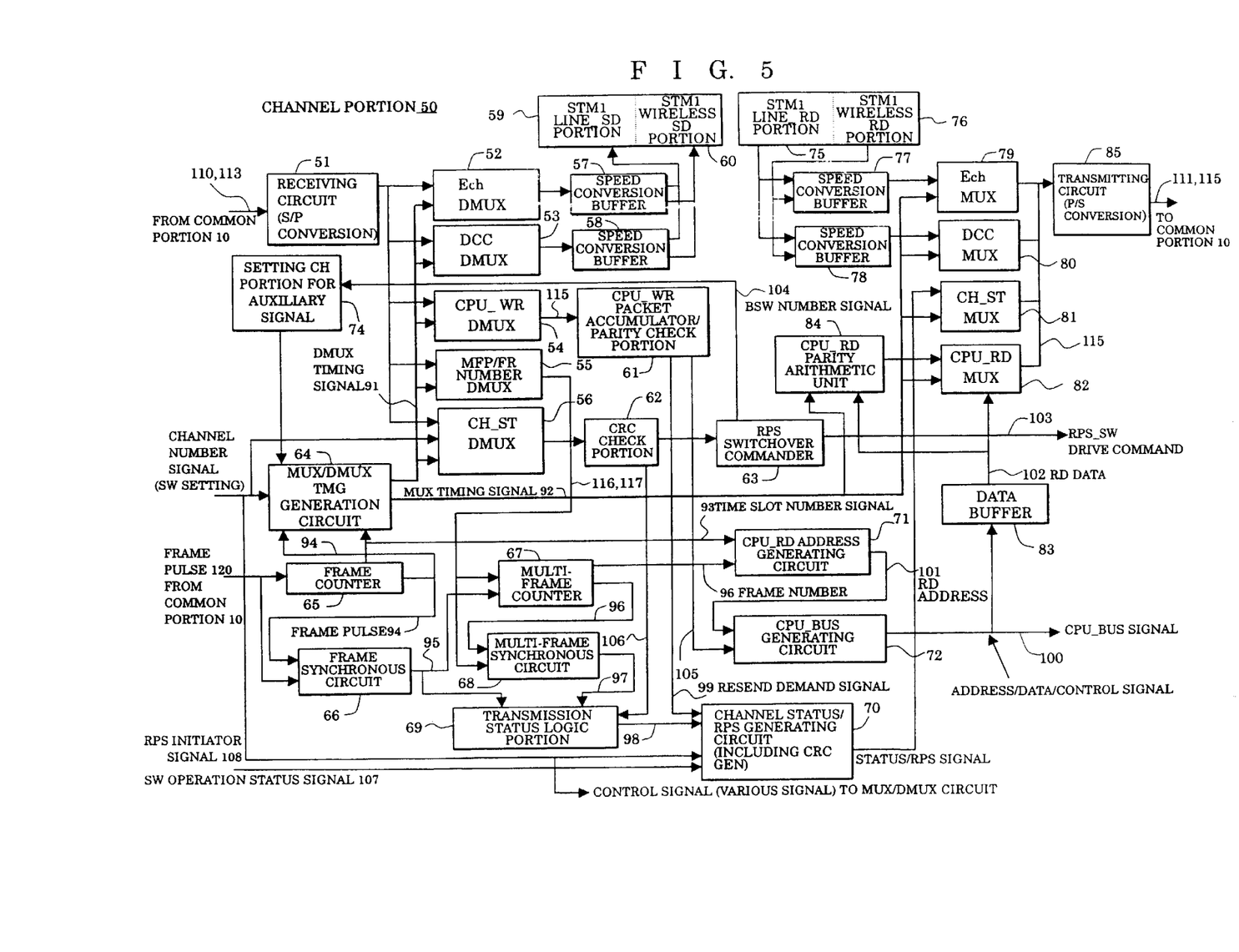
FIG. 5 is a block diagram showing an embodiment of a channel portion used in an information transfer equipment according to the present invention.

FIG. 5 shows an embodiment of the channel portion 50 shown in FIG. 1. The transmission line 110 from the common portion 10 is connected to a receiving circuit 51, to which an Ech demultiplexer 52, a DCC demultiplexer 53, a CPU_WR demultiplexer 54, a multi-frame pulse/frame number demultiplexer 55 and a channel status demultiplexer 56 are commonly connected. Speed conversion buffers 57, 58 are connected to the demultiplexers 52, 53, and an STM1 wire circuit transmitter 59 and an STM1 wireless circuit transmitter 60 are commonly connected to the speed conversion buffers 57, 58.

The demultiplexers 52–56 are connected to an output terminal of a multiplexing/demutiplexing timing generation circuit 64.

In addition, a CPU_WR packet accumulation/parity checking portion 61 is connected to the demultiplexer 54, a channel status/RPS generating circuit 70 and a CPU bus generating circuit 72, which is connected to a CPU bus signal 100 (hereinafter sometimes referred to as a pseudo CPU bus). A channel status multiplexer 81 is connected to the generating circuit 70.

The frame pulse 120 from the common portion 10 is inputted to a frame counter 65 and a frame synchronous circuit 66, and the counter 65 is connected to the timing generating circuit 64 and the frame synchronous circuit 66, to which a multi-frame counter 67 and a transmission status logic portion 69 are connected. The counter 67 is connected to a multi-frame synchronous circuit 68, to which the logic portion 69 is connected. The logic portion 69 is connected to the generating circuit 70.

The demultiplexer 55 is connected to the counter 67 and the synchronous circuit 68. In addition, a channel number signal is commonly inputted to the timing generation circuit 64, the channel status demultiplexer and the generating circuit 70. Moreover, an RPS initiator signal is inputted to the generating circuit 70.

In addition, the demultiplexer 56 is connected to a CRC check portion 62, which is connected to the logic portion 69 and an RPS switchover indicator 63 which outputs a drive command 103. The switchover indicator 63 is connected to the timing generating circuit 64 through a setting CH portion 74 for an auxiliary signal. The timing generation circuit 64 is connected to an Ech multiplexer 79, a DCC multiplexer 80, the multiplexer 81, a CPU_RD multiplexer 82, and a CPU_RD parity arithmetic unit 84. The counters 65, 67 are connected to a CPU_RD address generating circuit 71, which is connected to the generating circuit 72.

An STM1 wire receiver 75 and an STM1 wireless receiver 76 are commonly connected to speed conversion buffers 77, 78, which are connected to the multiplexers 79, 80. The multiplexers 79–82 are connected to the transmitting circuit 85, which is connected to the common portion 10 through the transmission line 111.

A data buffer 83 connected to the pseudo CPU bus 100 is connected to the multiplexer 82 and the arithmetic unit 84, which is connected to the multiplexer 82.

Operation (1) of Channel Portions 50

The operation of each of the channel portions 50 which has received the monitoring control information from the common portion 10 will now be described referring to FIG. 5.

The counter 65 counts the clock signal from the input point of the received frame pulse 120 and outputs a time slot number signal 93 and a frame pulse 94 of the present frame. Having detected the establishment of the frame synchronization by comparing the received frame pulse 120 with the frame pulse 94, the frame synchronous circuit 66 transmits a frame synchronous signal 95 to the counter 67 and the logic portion 69.

The counter 67 counts the synchronous signal 95 from the input point of a multi-frame pulse 116 from the demultiplexer 55 and outputs a frame number 96 to the synchronous circuit 68 and the address generating circuit 71. Having detected the establishment of the multi-frame synchronization by comparing the frame number 117 from the demultiplexer 55 with the frame number 96 from the counter 67, the synchronous circuit 68 outputs the multi-frame synchronous signal 97 to be notified for the logic portion 69.

The logic portion 69 determines a transmission status of its own based on the synchronous signals 95, 97 indicating the establishment of the frame synchronization and the multi-frame synchronization and the transmission control signal 106 from the check portion 62 to notify the generating circuit 70 a transmission status signal 98. In addition, the logic portion 69 transmits the control signal to the demultiplexers 52–56 and the multiplexers 79–82 based on the transmission status of its own to prescribe the operation of the demultiplexers and the multiplexers.

The timing generation circuit 64 acknowledges the position (frame number) and the time slot of the TDM frame 112 of the TDM multi-frame 113 presently transmitted, from the inputted time slot number signal 93 and the frame pulse 94. Based on the channel number set by an external switch a demultiplexing timing signal 91 and a multiplexing timing signal 92 corresponding to the signal type are provided for the demultiplexers 52–56 and the multiplexers 79–82.

The receiving circuit 51 receives the TDM multi-frame 113 which is a serial signal from the transmission line 110 and convert the same into a parallel signal. The demultiplexers 52–56 demultiplex the EOW signal, the DCC signal, the packet data 105, the multi-frame pulse 116, the frame number 117, the transmission control signal 106, the number signal 104 and the drive command 103 from the parallel signal.

The speed conversion buffers 57, 58 temporarily store the EOW signal and the DCC signal among the above-mentioned signals, and the transmitters 59, 60 read out the EOW signal and the DCC signal at the predetermined timing and write them in the predetermined position of an overhead of the STM1 signal.

Namely, the EOW signal and the DCC signal are equivalently subjected to a speed conversion through the speed conversion buffers 57, 58 and are multiplexed into the predetermined position of the overhead of the STM1 signal.

The check portion 61 receives the packet data 105 from the demultiplexer 54 and accumulates 15 packets of data 105 and parity data (1 byte) for a single frame. The check portion 61 carries out the parity check, and when the result is good, the packet data 105 are sent to the bus generating circuit 72 while when the result is not good, the packet is abandoned and a resend demand signal 99 is sent to the generating circuit 70. The bus generating circuit 72 processes an address and data included in the packet data 105 to output the CPU bus signal 100 which is the CPU write signal to the pseudo CPU bus.

As a result, it becomes possible for the registers of I/0 port (not shown), for instance, which has inputted the CPU bus signal 100 to filter the write data transmitted in the form of the packet data 105 from the CPU in the common portion 10 in a decoder and to selectively receive the data addressed to its own.

The check portion 62 executes the CRC check for the transmitting control signal 106, the channel number, the RPS_SW drive signal, and the number signal 104 received from the demultiplexer 56. When an error is detected the data are abandoned while when an error is not detected the transmission control signal 106 is sent to the logic portion 69, and the drive command 103 and the number signal 104 are sent to the switchover indicator 63. The switchover indicator 63 outputs the drive command 103 to drive the external RPS switcher (not shown).

It is to be noted that a CRC bit is assumed to be inserted into the status/RPS command signal as an arithmetic result by the transmission synchronous controller 44 in the common portion 10 on status/RPS command data.

In addition, the switchover indicator 63 sends the number signal 104 to the setting ch portion 74, which holds the number signal 104 and outputs it to the timing generation circuit 64, whereby it becomes possible to set the channel number instead of the SW setting.

Operation (2) of Channel Portions 50

Next, the operation of each of the channel portions 50 which transmits the EOW signal, the DCC signal, the transmission status signal, the RPS related signal and read data 102 which are the monitoring control information to the common portion 10 will now be described as follows:

The wire circuit receiver 75 and the wireless circuit receiver 76 demultiplex and extract the E1, E2 byte data which are the EOW signals and D1–D12 byte data which are the DCC signal from the overhead information of the STM1 signal as a main signal, which are written in the speed conversion buffers 77, 78, respectively.

The data EOW signal and the DCC signal the speed conversion buffers 77, 78 have temporarily stored are written in the predetermined position of the TDMA multi-frame 115 in the multiplexers 79, 80 at the timing of the timing signal 92.

Namely, the speed conversion buffers 77, 78 equivalently execute the speed conversion of the EOW signal and the DCC signal to be multiplexed into the predetermined position of the TDMA multi-frame 115 in the multiplexers 79, 80.

The generating circuit 70 receives the channel number of its own, an RPS initiator signal 108 and an SW operation status signal 107 from an RPS_SW portion (not shown), the transmission status signal 98 from the logic portion 69, and the resend demand signal 99 from the parity check portion. When the result of the parity check is found not good, the generating circuit 70 transmits a status/RPS notifying signal in which a CRC code is added to the initiator signal 108, the operation status signal 107, the transmission status signal 98, the channel number, and the resend demand signal 99 to the multiplexer 81 while when the result is found good, the generating circuit 70 transmits the notification signal, to which the resend demand signal is not added, to the multiplexer 81.

The address generating circuit 71 generates a readin address signal 101 from the time slot number signal 93 and the frame number 96, which is sent to the bus generating circuit 72. This readin address signal 101 is equal to a readin address at which the main CPU of the common portion 10 reads in condition information, control information PM (Performance Monitor) information, PI (Physical Inventory) information, PROV (Provisioning) information and the like which are the monitoring control information transmitted to the common portion 10 from the channel portions 50.

The bus generating circuit 72 reads out the data from e.g. the outside I/0 port register based on the readin address signal 101, and generates the CPU bus signal (address, read command, write command) 100 such as writing the read data 102 in the data buffer 83.

The data buffer 83 transmits the read data 102 to the multiplexer 82 and the arithmetic unit 84. The arithmetic unit 84 calculates 4 byte read data 102 and 1 byte parity signal and transmits the result to the multiplexer 82.

It is to be noted that the timing generation circuit 64 in the channel portion 50_1 in which the channel number e.g. "1" is designated sends the timing signal 92 which sequentially writes 4 byte read data+1 byte parity signal as one block in each of the time slots CPU_RD_PROT (5 slots) of the TDMA frame 114 having the frame number of 0–319 of the TDMA multi-frame 115, which will be described later, to the multiplexer 82.

Similarly, the timing generation circuit 64 of the channel portion 50_2 having the channel number 2 sends the timing signal 92, such as sequentially writes a data block in each of the time slots CPU_RD_Main 1 (5 slots), to the multiplexer 82. In the same way, the rest timing signals 92 of the channel portions 50_3–50_8 provide timings, at which the read data are written in each of the time slots CPU_RD_Main 2–7, for the multiplexer 82.

Also, the read data 102 of the channel portions 50 comprise the condition information which is multiplexed into the 1st–64th TDMA frames, the control information which is multiplexed into the 65th–128th TDMA frames, the PM information which is multiplexed into the 129th–192nd TDMA frames, the PI information which is multiplexed into the 193rd–256th TDMA frames, and the PROV information which is multiplexed into the 257th–320th TDMA frames.

The multiplexers 79–82 multiplex the received signal into the TDMA frame 114 at the timings of the timing signals 92 which are generally referred to as the same reference numeral "92" regardless of different timings in each signal and send the same to the transmission circuit 85. The transmission circuit 85 executes a parallel/serial conversion of the frame to be transmitted to the transmission line 111.

As a result, the EOW signal and the DCC signal, of the different signal types, from the wire circuit receiver 75 and the wireless circuit receiver 76; the initiator signal 108, the operation status signal 107, the transmission status signal 98, the channel number, and the resend demand signal 99 from the generator 70; and the read data 102 from the outside through the pseudo CPU bus are multiplexed into the TDMA multi-frame 115 by the multiplexer 82.

It is to be noted that in the channel portion 50 shown in FIG. 5 the processor for processing the SSMB signal is omitted.

Figure 6A:
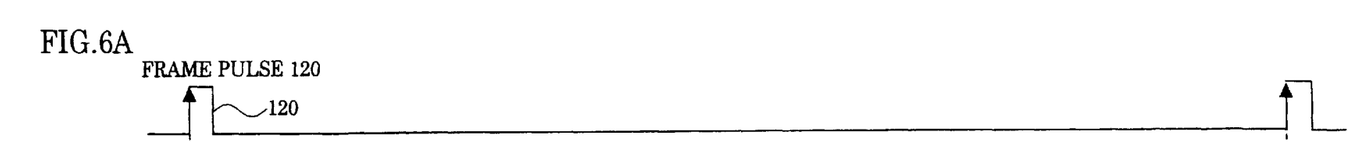
FIGS. 6A–6C are time charts illustrating arrangements of a TDMA frame used in an information transfer equipment according to the present invention.
Figure 6B:
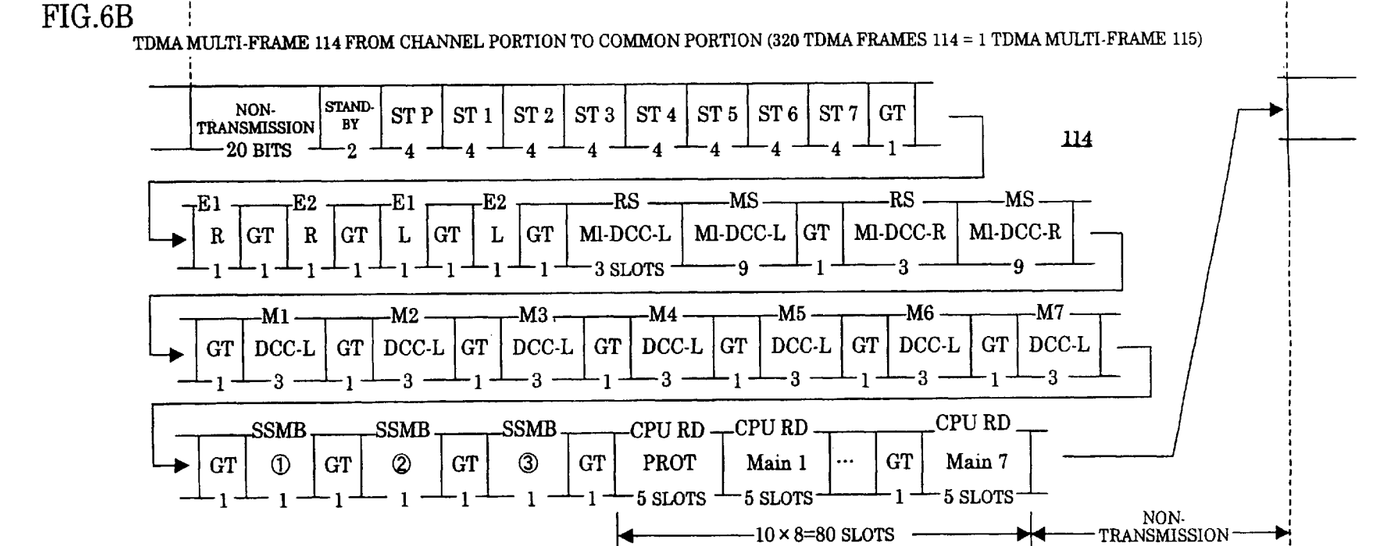

FIG. 6B shows an arrangement of the TDMA frame 114 transmitted to the transmission line 111, and the TDMA frames 114 continuously connected by 320 frames forms the TDMA multi-frame 115. The TDMA multi-frame 115 is generated in synchronization with the TDM multi-frame 113.

FIG. 6A shows the frame pulse 120, which is the same as the frame pulse 120 shown in FIG. 3A.

The TDMA frame 114 comprises a non-transmission portion of 20 bits, a standby slot, the status/RPS notification signals STP, ST1–ST7, the E1, E2 signals on the wireless and the wire circuit side, the RS/MS_M1_DCC signals, the RS/MS_Mn_DCC signals on the wireless circuit side, M1–M7_DCC signals, the SSMB signals SSMB①–③ on the wire circuit side, the CPU_RD_PROT, CPU_RD_Main1–7 signals which are the read-in data 102. Each signal has slots whose number is shown in the figure respectively.

Figure 6C:
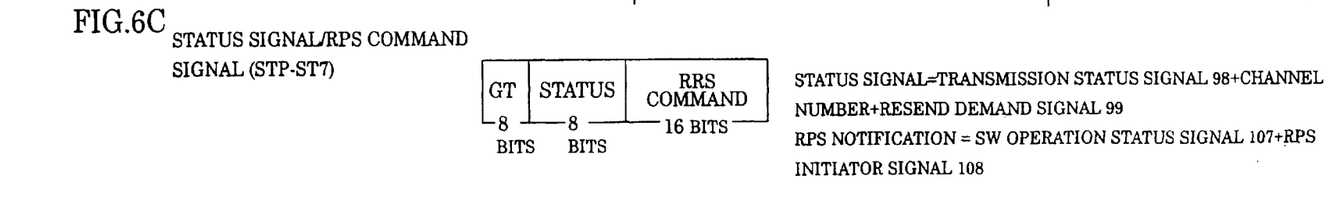

FIG. 6C shows an arrangement of the status/RPS notification signals STP, ST1–ST7, each of which comprises the guard time GT of 8 bits, a status signal of 8 bits, and an RPS notification signal of 16 bits.

The status signal comprises the transmission status signal 98, the channel number, and the resend demand signal 99. The RPS notification signal comprises the operation status signal 107 and the initiator signal 108.

Operation (2) of Common Portion 10

Next, the operation of the common portion 10 which has received the monitoring control information 90 in the TDMA multi-frame 115 from the channel portion 50 through the transmission line 111 will be described referring to FIG. 3 as follows:

The processor 41 carries out the serial/parallel conversion of the received TDMA multi-frame 115 to be sent to the demultiplexer 42. The demultiplexer 42 transmits the TDMA multi-frame to the interface 21, the interface 22, the memory 23, the register 24, and the memory 16.

The timing generator 30 transmits write timing signals 121, 122, 134, 135, 131, 133 to the interfaces 21, 22, write/read processors 34, 35, the packet read controller 31, and the write controller 33.

The interfaces 21, 22 have a buffer for demultiplexing the EOW signal and the DCC signal from the TDMA multi-frame 115, respectively, and extract the data from the buffer of its own at the timing of the timing signals 121, 122 and send the same to the EOW processor or the DCC processor.

The memory 23 and the register 24 extract and store the operation status signal 107, the initiator signal 108 and the SSMB signal on the TDMA multi-frame 115 at the timing of the write signals 136, 137 the write/read processors 34, 35 generate based on the timing signals 134, 135. The RPS processor reads out the signals 107, 108 from the memory 23. The TCU processor reads out the SSMB signal in the frame period.

The timing generator 30 outputs the timing signal 133 based on the TDM frame number and the slot position of the TDMA frame to which the read data is transmitted.

The memory 16 stores the read data of the channel portions 50 on the TDMA multi-frame at a predetermined address with the write signal 138 the write controller 33 generates based on the timing signal 133.

At this time, a data error detector built in the write controller 33 carries out the parity check to find whether or not there is an error in the read data. If there is an error and the read data 102 is fixed information of the channel, the read data is compulsorily set as "00", while if it is other information, the storing operation of the memory 16 is prohibited to hold the previous information.

The main CPU provides a read signal for the memory 16 by the register 14 and the read controller 15 through the interface 11 to read out the predetermined read data 102.

Particularly, when the value of the read data 102 of the CH fixed information is "00", the main CPU acknowledges a fault of the equipment corresponding to the read data 102 connected to the channel portions 50.

As a result of the above-mentioned operations (2) in the channel portion 50 and the common portion 10, plural kinds of data as the monitoring control information 90 transmitted from the each of the channel portions 50 are transferred to the predetermined EOW processor, DCC processor, RPS processor, TCU processor, and main CPU, respectively.

Moreover, in this embodiment, write address information to the memory 16 of the read-in data 102, i.e. transmission source information of the read-in data is converted into position information (frame number and slot position) of the TDMA multi-frame to which the read-in data is transmitted. However, it is also possible to insert the read-in data and the write address into the TDMA frame to be transmitted.

As described above, an information transfer equipment according to the present invention is arranged such that a multiplexer of a common portion multiplexes monitoring control information into a TDM frame to be transmitted to channel portions, a demultiplexer of each channel portion receives the monitoring control information from the common portion based on a channel number preset to its own to be demultiplexed, a multiplexer of each channel portion multiplexes the monitoring control information into the TDMA frame based on the number, a demultiplexer of the common portion receives the monitoring control information from the channel portions to be demultiplexed from the TDMA frame according to kinds of each channel portion. Therefore, it has become possible to transmit and receive the monitoring control information between the common portion and each of the channel portions without increasing the cost of equipment and the burden of the monitoring control process.

Also, it has become possible to lessen the number of a cable or a connector which connects the common portion and the channel portions, and to reduce the cost of the whole equipment as well as the operation time for construction and local adjustment.

In addition, the information transfer equipment according to the present invention is arranged such that processors of each channel portion process the monitoring control information including the overhead information of the STM1 signal of the SDH, and the multiplexers of the common portion and each of the channel portions generate the TDM frame and the TDMA frame based on the synchronous clock of the STM signal. Therefore, it has become possible that this equipment is integrated into a high-speed information highway of the SDH and to transmit the monitoring control information.

What I claim is:

1. An information transfer equipment comprising:
   a plurality of channel portions, and
   a common portion which executes a monitoring control for each of the channel portions by transmitting/receiving plural kinds of monitoring control information with each of the channel portions;
   the common portion having a multiplexer which multiplexes the monitoring control information into a TDM frame to be transmitted to the channel portions, and a demultiplexer which receives the monitoring control information from each of the channel portions to be demultiplexed from a TDMA frame according to kinds of the monitoring control information, and
   each of the channel portions including a multiplexer which multiplexes the monitoring control information into the TDMA frame based on a channel number preset for its own, and a demultiplexer which receives the monitoring control information from the common portion, based on the channel number, to be demultiplexed from the TDM frame.

2. An information transfer equipment as claimed in claim 1 wherein the TDMA frame is transmitted in synchronization with a timing of the TDM frame.

3. An information transfer equipment as claimed in claim 1 wherein the common portion and each of the channel portions respectively comprise a processor which processes the monitoring control information including overhead information of an STM signal on an SDH communication line, and the multiplexers of the common portion and each of the channel portions respectively generate the TDM frame and the TDMA frame based on a synchronous clock of the STM signal.

4. An information transfer equipment as claimed in claim 3 wherein the processor of each of the channel portions comprises a buffer for temporarily storing the overhead information on the TDM frame, and another buffer for temporarily storing the overhead information included in the STM signal; the overhead information stored in the buffer being written in an overhead of the STM signal at a predetermined timing, and the overhead information stored in the other buffer being written in the TDMA frame at a predetermined timing.

5. An information transfer equipment as claimed in claim 1 wherein the channel portion includes a setting portion for setting time slots from outside which the TDM and the TDMA frame corresponding to the channel number access.

6. An information transfer equipment as claimed in claim 1 wherein the common portion includes a CPU for processing the monitoring control information, a packet generator for converting an address or data, which is the monitoring control information on a system bus of the CPU, into packet data at every timing when the CPU executes write access to each of the channel portions, and a packet buffer for accumulating the packet data divided into an amount which can be transmitted in one cycle of the TDM frame;

the multiplexer of its own multiplexes the packet data accumulated in the packet buffer into a predetermined slot of the TDM frame, and each of the channel portions includes a CPU bus generator which generates a pseudo CPU bus for the CPU based on the received packet data.

7. An information transfer equipment as claimed in claim 6 wherein the packet generator monitors the packet data amount accumulated in the packet buffer and delays a return time of an acknowledge signal for the write access of the CPU to the channel portions when the accumulated packet data amount has reached at least one preset or changeable packet write threshold.

8. An information transfer equipment as claimed in claim 6 wherein the common portion includes a packet read controller which adds error detection data to the packet data accumulated in the packet buffer and when resend demand signals of the packet data from the channel portions are received the packet data of the last TDM frame is resent within a predetermined largest number of resend times, and when the channel portions detect an error in the packet data received based on the error detection data the channel portions transmit the resend demand signal to the predetermined time slot of the TDMA frame.

9. An information transfer equipment as claimed in claim 1 wherein the common portion includes a CPU and a CPU read interface memory for processing the monitoring control information, each of the channel portions includes a CPU bus generator for generating a pseudo CPU bus for the CPU, an address generator for generating a read address for the pseudo CPU bus, and a data buffer for storing the read address which is the monitoring control information and read data accessed by the read address, the multiplexer of its own multiplexing the read address and the read data stored in the data buffer, and the demultiplexer in the common portion demultiplexes the read address and the data, the CPU read interface memory stores the data at the read address as a write address, and the CPU reads in the data of the interface memory.

10. An information transfer equipment as claimed in claim 1 wherein the common portion includes a CPU and a CPU read interface memory for processing the monitoring control information, and the multiplexer in the common portion transmits a TDM multi-frame composed of a plurality of TDM frames including a TDM frame number, each of the channel portions includes a CPU bus generator for generating a pseudo CPU bus for the CPU, an address generator for generating a read address for the pseudo CPU bus, and a data buffer for storing the read address which is the monitoring control information and read data accessed by the read address, the demultiplexer in the channel portion establishing a synchronization for the TDM multi-frame to demultiplex therefrom the TDM frame number, and the multiplexer of the channel portion multiplexing the read data into the TDM frame number and a time slot position corresponding to the read address, and the demultiplexer in the common portion demultiplexes the read data from the TDMA frame, and stores in the CPU read interface memory the read data at the address corresponding to the TDM frame number and the slot position corresponding to the TDMA frame into which the read data is inserted.

11. An information transfer equipment as claimed in claim 9 wherein the channel portion includes an arithmetic unit which adds error detection data for the read data of its own, and the common portions each include a data error detector for detecting an error of the read data based on the error detection data, and when the error is detected the CPU read interface memory abandons the read data and holds the read data in a previous state.

12. An information transfer equipment as claimed in claim 11 wherein when the read data with the error detected is fixed information of each of the channel portions, a fixed value indicating that the error has been detected is compulsorily written in the interface memory, and when the read data is other information, the received data is abandoned and the received data is held in a previous state.

13. An information transfer equipment as claimed in claim 1 wherein the monitoring control information includes at least one of transmission status information to the TDMA frame of the channel portion, control status information for each of the channel portions of the common portion, circuit switchover control information of the channel portion and system clock control related information.

\* \* \* \* \*